(12) United States Patent
Denis

(10) Patent No.: US 7,080,869 B2
(45) Date of Patent: Jul. 25, 2006

(54) ROTATION TRANSMISSION DEVICE COMPRISING BEARING-FORMING ZONES

(75) Inventor: Tores Denis, Vaux le Penil (FR)

(73) Assignee: Inderflex-Technoflex, Le Châtelet en Brie (FR)

( * ) Notice: Subject to any disclaimer, the term of this patent is extended or adjusted under 35 U.S.C. 154(b) by 0 days.

(21) Appl. No.: 10/999,454

(22) Filed: Nov. 30, 2004

(65) Prior Publication Data

US 2005/0121586 A1    Jun. 9, 2005

Related U.S. Application Data

(63) Continuation of application No. PCT/FR2003/003395, filed on Nov. 14, 2003.

(30) Foreign Application Priority Data

Nov. 18, 2002  (FR)  .................................. 02 14418

(51) Int. Cl.
B60N 2/00       (2006.01)

(52) U.S. Cl. .......................... 296/63; 74/89.2; 74/89.17

(58) Field of Classification Search .................. 296/63; 297/344.1; 248/425, 429, 430; 74/89.2, 74/89.17, 89.11

See application file for complete search history.

(56) References Cited

U.S. PATENT DOCUMENTS

| 1,568,546 | A |  | 1/1926  | Cook |
| 3,292,389 | A |  | 12/1966 | Adloff |
| 3,389,579 | A |  | 6/1968  | Werner et al. |
| 3,443,307 | A |  | 5/1969  | Werner et al. |
| 4,915,340 | A |  | 4/1990  | Nawa et al. |
| 5,558,578 | A |  | 9/1996  | Uryu et al. |
| 5,893,426 | A |  | 4/1999  | Shimizu et al. |
| 5,931,736 | A |  | 8/1999  | Scherer et al. |
| 6,038,819 | A |  | 3/2000  | Klein |
| 6,318,785 | B1 |  | 11/2001 | Tousignant |
| 6,695,275 | B1 | * | 2/2004  | Schüler et al. .............. 248/424 |
| 2001/0048058 | A1 | * | 12/2001 | Folliot ........................ 248/429 |

(Continued)

FOREIGN PATENT DOCUMENTS

DE          200 14 561        12/2000

(Continued)

OTHER PUBLICATIONS

International Search Report for PCT/FR2004/000597 dated Sep. 17, 2004.

(Continued)

Primary Examiner—Lori L. Coletta
(74) Attorney, Agent, or Firm—Harness, Dickey & Pierce, P.L.C.

(57) ABSTRACT

The invention relates to a rotation transmission device and a motor vehicle seat adjustment system comprising one such device. The inventive transmission device comprises a flexible shaft and a casing which houses the shaft therein. The aforementioned casing comprises a core consisting of a hollow cylinder having an inner diameter which is dimensioned such as to enable the rotation of the shaft inside said core. The core of the device comprises at least one bearing-forming zone which is obtained by means of plastic deformation, said zone comprising at least three parts, namely: two outer parts and one central part. The axes of the above-mentioned parts are essentially parallel to that of the core while the diameter of said parts is essentially equal to that of the core. Moreover, the outer parts are substantially coaxial and comprise an axis which is offset in relation to the axes of the central part and the core.

13 Claims, 2 Drawing Sheets

U.S. PATENT DOCUMENTS

2004/0012236 A1 * 1/2004 Mallard .................. 297/344.1

FOREIGN PATENT DOCUMENTS

| EP | 1 245 434 A1 | 10/2002 |
|---|---|---|
| EP | 1 286 065 A1 | 2/2003 |
| FR | 674177 | 1/1930 |
| FR | 1266374 | 5/1961 |
| FR | 2 822 418 | 9/2002 |
| GB | 327566 | 4/1930 |
| GB | 1 203 191 | 8/1970 |
| GB | 2 176 562 A | 12/1986 |
| JP | 7-310730 | 11/1995 |
| WO | WO 92/08061 | 5/1992 |

OTHER PUBLICATIONS

International Search Report for PCT/FR03/03395, dated Jul. 4, 2004, 3 pages.

* cited by examiner

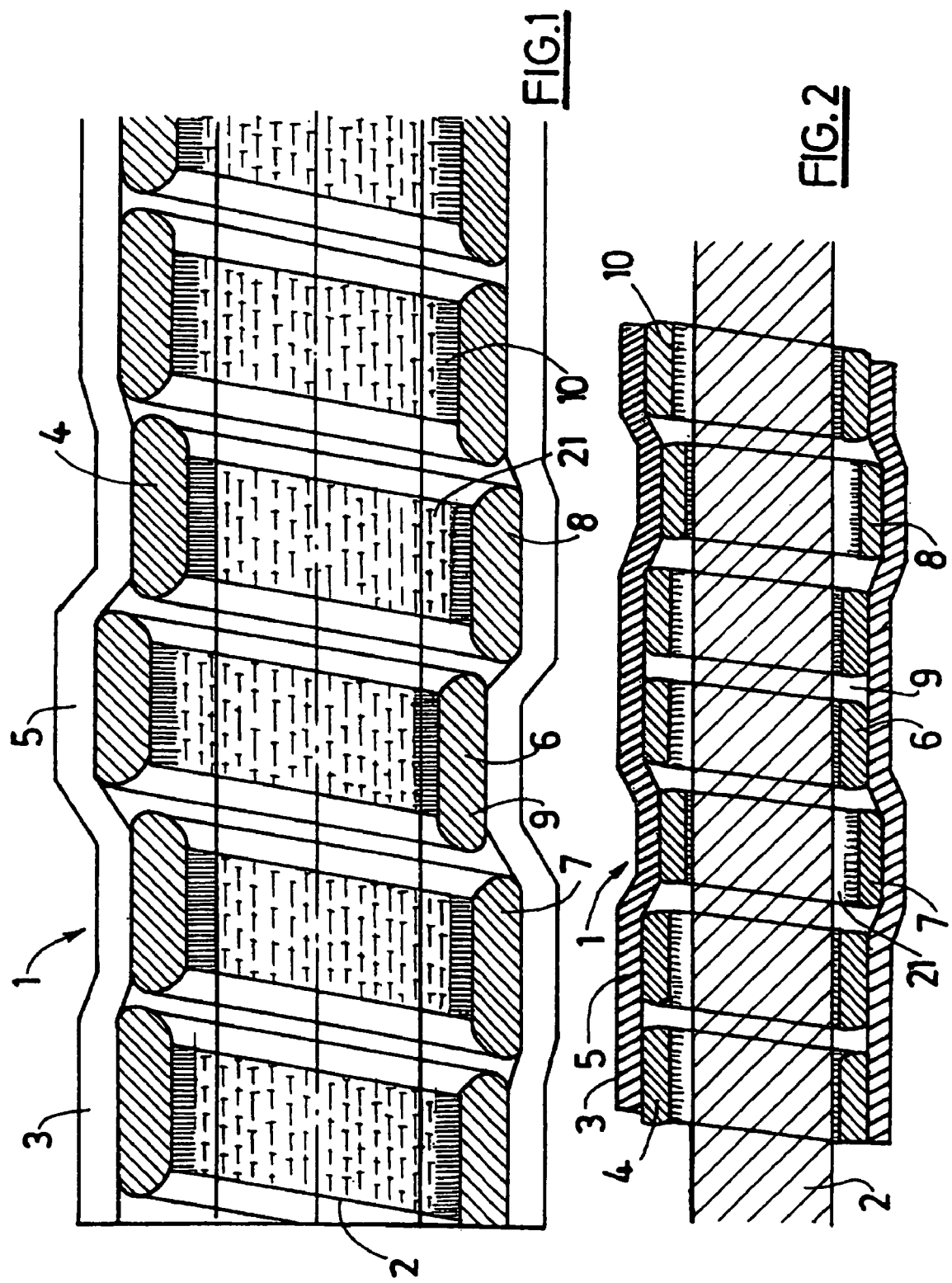

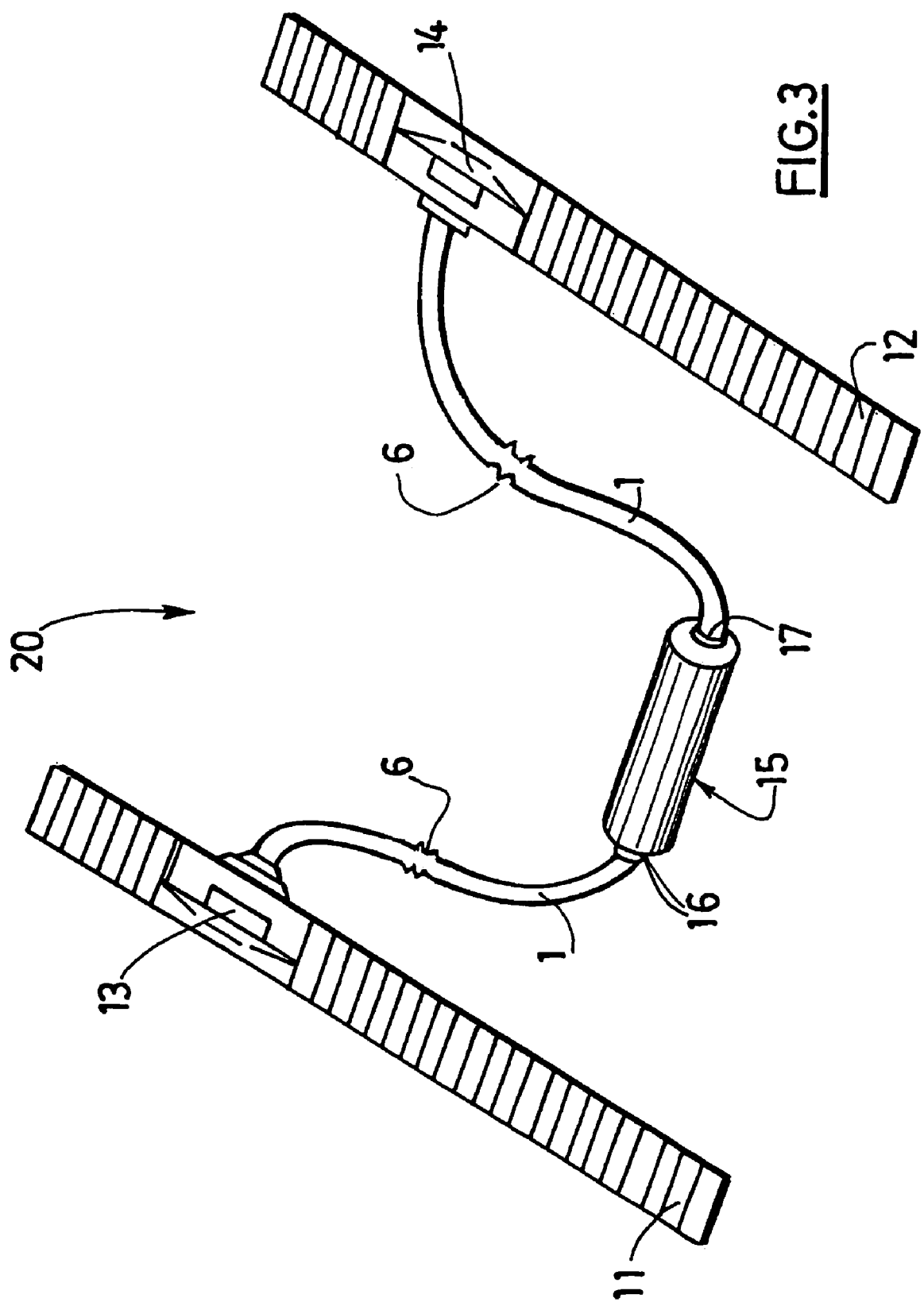

ROTATION TRANSMISSION DEVICE COMPRISING BEARING-FORMING ZONES

CROSS REFERENCE TO RELATED APPLICATIONS

This application is a continuation of PCT/FR2003/003395, filed Nov. 14, 2003, which claims priority to French Application No. 02/14418, filed Nov. 18, 2002; both of which are incorporated by reference herein.

BACKGROUND AND SUMMARY

Rotation transmission devices are known which comprise a flexible shaft and a sheath inside which the shaft is housed. In these transmission devices, in particular for adjusting seats for motor vehicles, the speeds of rotation of the shaft in the sheath are greater than 2000 revolutions/minute, conventionally around 3000 revolutions/minute. To allow rotation at such speeds, a clearance of a few tenths of a millimeter is necessary between the shaft and the sheath. However, this clearance gives rise, during the rotation, to the appearance of low-amplitude vibrations which propagate along the shaft and cause an unpleasant noise and sensation to the touch.

To resolve this problem of vibration, the document JP 07 310 730 proposes a rotation transmission device whose sheath has at least one deformation in the form of a constriction, that is to say a local reduction in the diameter of the sheath. This is because this constriction, by causing gripping contact between the shaft and the sheath, limits the vibrations. However, this contact creates significant rubbing between the shaft and the sheath, which makes it necessary to increase the motor torque in order to obtain a sufficient speed of rotation of the shaft for the application envisaged. In addition, this friction causes premature wear on the sheath at the deformation.

The invention aims to mitigate these drawbacks by proposing a device for transmitting a rotation movement whose sheath has permanent deformations which are arranged so as to limit the vibrations without reducing the inside diameter of the sheath. To this end and according to a first aspect, the invention concerns a device for transmitting a rotation movement, this device comprising a flexible shaft and a sheath inside which the shaft is housed, the sheath comprising a core formed by a hollow cylinder whose inside diameter is arranged so as to allow the rotation of the said shaft inside the said sheath. The core of the sheath comprises at least one zone forming a bearing which is obtained by plastic deformation of the core, this zone comprises at least three parts, two outer parts and a central part. These parts have axes substantially parallel to that of the core and have a diameter substantially equal to that of the core, the outer parts being substantially coaxial and with their axis offset with respect to the axes of the central part and the core.

According to one embodiment, the central part of the zone forming a bearing and the core of the sheath are substantially coaxial. According to one embodiment, the sheath comprises several zones forming a bearing spaced apart from each other by a distance of between 5 and 15 centimeters. According to another embodiment, the zones are disposed continuously along the sheath. According to one embodiment, the core of the sheath is provided on its internal surface with a flock coating.

According to a second aspect, the invention concerns an adjustment system for a motor vehicle, comprising at least one adjustment runner mounted on the structure of the vehicle and adjustable means of fixing the seat to the runner, the system also comprising a drive motor having at least one rotary output. The system also comprises a device for transmitting a rotation movement of the type described above which is disposed between the output of the said drive motor and the said fixing means, so as to move the fixing means along the adjustment runner in response to a rotation of the output. The invention will be clearly understood from a reading of the following description, given with reference to the accompanying figures.

BRIEF DESCRIPTION OF THE DRAWINGS

FIG. 1 is a partial view in longitudinal section of a rotation transmission device, showing a zone forming a bearing according to one embodiment of the invention.

FIG. 2 is a partial view in longitudinal section of a rotation transmission device, showing a zone forming a bearing according to a second embodiment of the invention.

FIG. 3 is a perspective view of an adjustment system for the motor vehicle seat according to the invention.

A device for transmitting a rotation movement 1 comprises a flexible shaft 2 and a sheath 3. The shaft 2 is housed in the sheath 3, whose inside diameter is designed so as to allow the rotation of the shaft 2 in the sheath 3. The speeds of rotation of the shaft 2 are conventionally around 3000 revolutions/minute. To allow rotation at this speed, a clearance of a few tenths of a millimeter is provided between the shaft 2 and the sheath 3.

The sheath 3 comprises a core 4 and an external tubular envelope 5 enclosing the core 4. The core 4 can for example be formed by a helical spring made from metallic material. This spring is for example formed from a metallic strip wound in a helix. The turns of the spring are non-contiguous, which confers flexibility on the sheath. The external envelope 5 can be produced from an extruded plastics material.

Referring to FIGS. 1 and 2, the sheath 3 has a permanent deformation in the form of a zone forming a bearing 6, the bearing extending in the longitudinal direction of the device. The zone forming a bearing comprises three parts, two outer parts 7 and 8 and a central part 9. The axis of each of these parts is substantially parallel to that of the core 4. The outer parts 7 and 8 are also coaxial and their axis is offset with respect to that of the core 4. In the description, the axes are defined in the stable rectilinear position of the sheath, as depicted in FIGS. 1 and 2. Each part 7–9 also has an inside diameter substantially equal to the inside diameter of the core 4 and comprises a whole number of consecutive turns.

According to the embodiment of the invention depicted in FIG. 1, the zone forming a bearing 6 of the transmission device 1 comprises two outer parts 7, 8 and a central part 9 formed by a single turn. The axes of each part are offset with respect to the axis of the core so that the common axis of the outer parts 7 and 8 and the axis of the central part 9 are substantially symmetrical with respect to the axis of the core 4.

According to the embodiment of the invention depicted in FIG. 2, the zone forming a bearing 6 of the transmission device 1 comprises two outer parts 7, 8 formed by a single turn and a central part 9 formed by two turns. The central part 9 is also coaxial with the core 4 of the sheath. According to the invention, several zones forming a bearing can be distributed along the sheath. In one embodiment, the distance separating two zones is typically between 5 and 15 centimeters. According to another embodiment, the zones are disposed continuously along the sheath.

The zone forming a bearing 6 causes an offsetting of the metallic turns of the sheath 3 without reducing the inside diameter of the said turns. This creates a slightly sinuous path inside the sheath 3 with points of contact between the sheath 3 and the shaft 2 which are opposed with respect to the axis of the sheath and alternating on each side of this axis. These points of contact eliminate all possibility of vibrating the shaft in movement without for all that restricting the latter. The motor torque can thus be similar to that used with non-deformed sheaths and the sheath does not have a tendency to premature wear at the deformations. Moreover, the spaces left free between the sheath 3 and the flexible shaft 2 can form a reserve of grease 21 for lubricating the shaft 2.

The deformations of the sheath 3 are produced by plastic deformation of the sheath, for example by means of a press whose jaws are arranged so as to offset the turns radially. These deformations are therefore permanent and mounting the device requires no additional part for maintaining these deformations.

Referring to FIGS. 1 and 2 and according to a particular embodiment of the invention, the core 4 of the sheath 3 comprises a flock coating 10 on its internal surface, that is to say the surface facing the shaft 2. This is because it was possible to observe that such an arrangement in which the sheath is internally flock coated had optimum noise damping. The flock lining provides mechanical isolation between the shaft and the sheath. Forming this flock coating on the sheath, in combination with the deformation 6, gives good results from the acoustic point of view. The internal surface of the core 4 is covered by any known method, for example electrostatically, with a flock coating 10 which can comprise polyamide 6.6 fibres.

Such a device for transmitting a rotation movement can be used in a system for adjusting a motor vehicle seat 20 as depicted in FIG. 3. To this end, two runners 11 and 12 are fixed by any suitable means to the structure, not shown, of a motor vehicle. These runners have adjustment notches, the function of which will be described below. The runners 11 and 12 support the framework of a seat, also not shown, of the vehicle, whose movement and fixing with respect to the runners are provided by gears 13 and 14 respectively provided with toothed wheels cooperating with aforementioned notches on the runners 11 and 12.

An electric motor 15 is fixed to the structure of the vehicle or, in a variant, to the framework of the seat. This motor 15 has two rotary outputs 16 and 17. These outputs 16 and 17 are connected by devices for transmitting a rotation movement 1 according to the invention to the gears 13 and 14 respectively.

DETAILED DESCRIPTION

The zones forming a bearing of the transmission devices 1 are provided at locations on the sheath which are substantially rectilinear at the time of mounting in the adjustment system 20. This is because it has been found that it is at such locations that the vibrations occur and propagate to the greatest extent. When the motor 15 is supplied, it drives the shafts of the transmission devices 1 in rotation inside their sheaths. These shafts in their turn drive the gears 13 and 14, which has the effect of moving the seat along the runners 11 and 12.

What is claimed is:

1. A device for transmitting a rotation movement comprising a flexible shaft and a sheath inside which the shaft is housed, said sheath comprising a core formed by a hollow cylinder whose inside diameter is arranged so as to allow the rotation of said shaft inside said sheath, said device comprises at least one zone forming a bearing which is obtained by plastic deformation of the core, said zone comprising at least three parts, two outer parts and a central part, said parts having axes substantially parallel to that of the core and having a diameter substantially equal to that of the core, the outer parts being substantially coaxial and with their axis offset with respect to the axes of the central part and the core.

2. A transmission device according to claim 1 wherein, the central part of the zone forming a bearing and the core of the sheath are substantially coaxial.

3. A transmission device according to claim 1 wherein the core of the sheath is formed by a helical spring made from metallic material.

4. A transmission device according to claim 3 wherein each part of the zone forming a bearing comprises a whole number of turns on the helical spring.

5. A transmission device according to claim 4 wherein the turns on each part of the zone forming a bearing are consecutive.

6. A transmission device according to claim 1 wherein the outer parts of the zone forming a bearing each comprise a turn and in that the central part comprises two turns.

7. A transmission device according to claim 1 wherein said sheath comprises several zones forming a bearing, said zones being spaced apart from each other by a distance of between 5 and 10 centimeters.

8. A transmission device according to claim 1 wherein the sheath comprises several zones forming a bearing, said zones being disposed continuously along the sheath.

9. A transmission device according to claim 1 wherein the sheath of said device also comprises an outer tubular envelope made from plastics material which encloses the core.

10. A transmission device according to claim 1 wherein the core is provided on its internal surface with a flock coating.

11. A transmission device according to claim 3 wherein the helical spring is formed from a metallic band wound in a non-contiguous helix, the internal face of said metallic band facing the axis of said sheath being provided with a flock coating.

12. A transmission device according to claim 10 wherein the flock coating comprises fibers formed from polyamide 6.6.

13. A seat adjustment system for a motor vehicle, comprising at least one adjustment runner mounted on the structure of the vehicle and adjustable means for fixing the seat to said runner, said system also comprising a drive motor having at least one rotary output, said adjustment system comprises a transmission device, which is disposed between the output of said drive motor and said adjustable means, so as to move said adjustable means along said adjustment runner in response to a rotation of said output, wherein zones forming a bearing are provided at locations on a sheath which are substantially rectilinear.

* * * * *